Sept. 28, 1954     C. L. HUBER     2,690,227
BOTTOM HOLE SAMPLER

Filed Aug. 10, 1951     2 Sheets-Sheet 1

INVENTOR.
CLYDE L. HUBER
BY
Mellin and Hanson
ATTORNEYS

Sept. 28, 1954

C. L. HUBER 2,690,227

BOTTOM HOLE SAMPLER

Filed Aug. 10, 1951

INVENTOR.
CLYDE L. HUBER

BY

Mellin and Hanson

ATTORNEYS

Patented Sept. 28, 1954

2,690,227

UNITED STATES PATENT OFFICE 2,690,227

BOTTOM HOLE SAMPLER

Clyde L. Huber, Houston, Tex., assignor, by mesne assignments, to Johnston Testers, Inc., Houston, Tex., a corporation of Delaware Application August 10, 1951, Serial No. 241,251

14 Claims. (Cl. 166—165)

This invention relates to well testing apparatus and methods for deep well bores, and is particularly concerned with determining the composition and characteristics of the native fluid at a selected point in a well bore.

The present application is co-pending with my prior application for Well Testing Method and Apparatus, Serial No. 153,513, filed April 3, 1950, and may be considered a continuation in part thereof and is an improvement thereover.

In testing samples of well fluids it is of utmost importance that the samples being tested are provided under the same or similar conditions existing in the formation from which the sample has been recovered. Only under these conditions is reliable and accurate information obtained by the test. Accordingly, it is the main object of the present invention to provide a testing apparatus by which a sample of well fluid is recovered and provided for testing purposes under substantially the same conditions existing in the formation from which the well fluid is recovered.

More particularly, it is a prime object of the present invention to provide such a testing apparatus which will sample and recover well fluid at the static pressure existing in the formation.

A further object of the present invention is to provide an improved method and apparatus for sampling well fluids and determining well pressures, the control and operation of which are by means of manipulation of a test string.

More particularly, it is an object of the present invention to provide a testing apparatus including a tester body having a test receptacle which is adapted to be filled with uncontaminated formation fluid and closed by manipulation of the drill string.

It is still another object of the present invention to provide such a test receptacle which has a valve operatively connected to the drill string so that the valve can be closed by manipulation of the drill string, and which valve is connected to the drill string by means including a shear pin so that after the valve is closed the shear pin is sheared and releases the valve from control by the drill string.

Another object of the present invention is to provide an improved test receptacle of the type adapted to be detachably secured to a tester or the like.

Numerous other objects and features of the present invention will be apparent from a consideration of the following specification taken in conjunction with the accompanying drawings in which.

Figure 1:
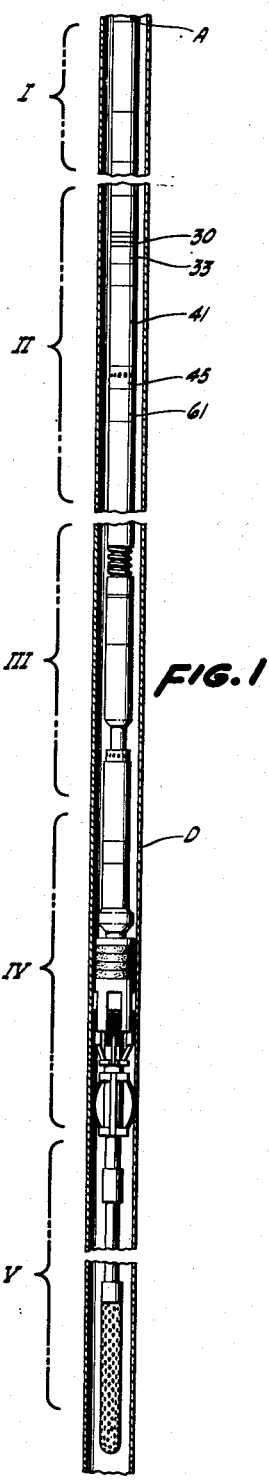
Fig. 1 is a side elevation of an entire test string embodying the present inventive concept.

The present apparatus in an overall relationship of major components is somewhat similar to the apparatus disclosed in my prior identified co-pending application. The test string here illustrated in detail as embodying a preferred form of the present invention may be defined as including a trip valve assembly I, a test receptacle and control assembly II, a retaining valve and equalizer assembly III, a packer IV, and a recorder and anchor pipe V. The details of units I, III, IV and V are set forth in said co-pending application and need not be duplicated here. While the test string thus constituted exemplifies one practical application of the present inventive concept, it should be understood that the invention is not limited to this specific structure and arrangement of parts. Obviously other forms of trip valves, equalizers and retaining valves as well as packers and the like may be used in the string as full equivalents of the structure here shown by way of illustration. It will also be understood that the specific relation of the components here present need not be adhered to, nor is the invention restricted to the use of all the components here shown. Other formation testing apparatus may be substituted or added as circumstance may dictate without departure from the present invention. It may also be noted that while the components are shown as closely coupled by short nipples or subs, such coupling is by no means a requisite and the components may be spaced by many feet of intervening tubing if desired. For instance, as indicated by the break in Fig. 1, the trip valve may be a long distance from the test receptacle II. Other components may be similarly spaced as desired.

In general terms, the formation tester includes a lower portion B, forming the major portion of the tester, rotatably supported from a drill string A by means of a jack mandrel C, forming the upper minor portion of the tester, fixedly secured to the drill string A. The major portion B is adapted to be non-rotatably secured to casing D by means of the packer IV and the associated slips, whereby rotation of the drill string and therefore the jack mandrel C relative to portion B can be utilized for the purpose of operating a shut-in pressure reverse circulation valve assembly, generally entitled E, and a receptacle valve assembly F. The receptacle valve assembly F is adapted to open and close a test receptacle G detachably secured to and in the lower portion B of the formation tester.

In my prior co-pending application, I disclosed a formation tester having a detachable test receptacle for entrapping a sample of native fluid, the test receptacle having a valve assembly including a pressure responsive valve for opening and closing the receptacle. This pressure responsive valve is not under the control of the drill string and can only be exposed, not operated, by manipulation of the drill string. In the present invention, it is desirable to be able to positively control the receptacle valve assembly so that there is a positive closing and opening of the receptacle. It is also desirable in the present invention to provide a releasable connection such as a shear pin between the drill string and the receptacle valve assembly so that after a sample is entrapped and the receptacle closed, the control over the receptacle valve assembly by the drill string is released, thereby avoiding any accidental opening of the receptacle by twisting or turning movement of the drill string.

More particularly, reference is had to the accompanying drawings wherein similar parts are given similar reference numerals throughout. The formation tester includes a sub 30a connected at its upper end to the drill string A and at its lower end to jack mandrel C, a thrust bearing 30 being mounted below the sub 30a, encircling jack mandrel C and spacing the sub 30a from a split ring 33. Split ring 33 abuts the top of a packing box 35, within which a packing gland 34 receives packing material 36 which seals against the external wall of jack mandrel C. Jack mandrel C is provided with external threads 38 which engage internal threads 39 on a cross head 40 which is slidably mounted within a tubular section 41. Packings 44 and 46, by virtue of their frictional engagement with lower mandrel portion 42, function to retard rotary movement thereof so that when jack mandrel C is rotated, it will thread into or out of cross head 40 to pull mandrel 42 upward or force it downward depending upon the direction of rotation of said mandrel.

The shut-in pressure reverse circulation assembly E includes a shut-in pressure reverse circulation valve member 42 formed by a reduced hollow lower portion of cross head 40 and having ports 43. Valve member 42 is surrounded by a sub 45 having spaced upper and lower packing 44 and 46 sealing against valve member 42 and retained in place by glands 47, said sub being threadedly connected at its upper end to tubular section 41.

Sub 45 is ported transversely at 48, at points between packing 44 and 46, said ports at their inner ends communicating with an annular groove 49, and at their outer ends communicating with the space between the formation tester and the well casing D.

Valve member 42 is adapted to be moved, by the jack mandrel C, to position ports 43 thereof below the sub 45 to allow the flow of native fluid up through valve member 42; to position ports 43 generally opposite packing 46 to prevent flow of native fluid up or down through the valve member to shut in the fluid above the valve member; to position ports 43 in registry with ports 48 for reverse circulation purposes.

In order to prevent contamination of the sample and possible premature unseating of the valve assembly F, as will be apparent later, an extension 42a is provided on the lower end of valve member 42. This extension 42a may be a separate member threaded to the lower end of valve member 42, as illustrated, or may be an integral extension thereof, as desired. The upper end of the extension member 42a is closed and its lower end is counterbored, and provided with the ports 42b.

The receptacle valve assembly F includes a valve stem 54 secured to the valve extension member 42a by a shear pin 55, the valve stem 54 being adapted to move in the counterbored extension 42a. In order to insure against premature unseating of the valve assembly F after the recovery and entrapment of a sample, it is preferable that the valve stem 54 and counterbored extension 42a be so constructed and arranged that throughout the operative positions of these parts the valve stem 54 does not move out of the counterbored extension 42a. The valve stem 54 has an upper receptacle valve 56 preferably formed integrally thereon and a lower receptacle valve 57 provided on the lower end thereof. The details of the receptacle valve assembly will be described hereinafter.

Figure 2:
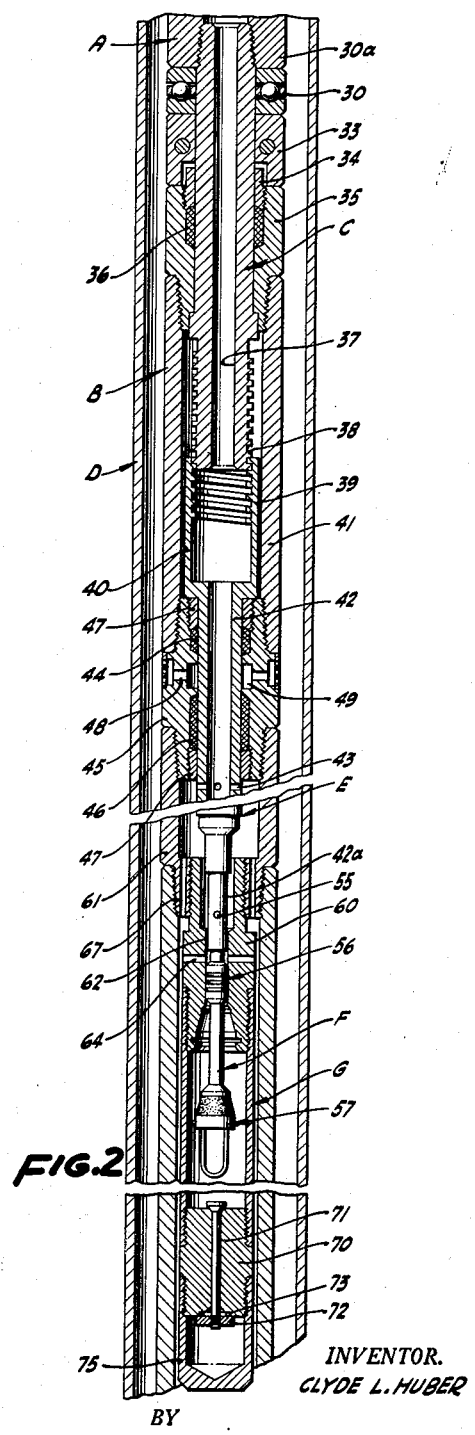
Fig. 2 is a detailed vertical section of the test receptacle and its control assembly indicated at II in Fig. 1 showing the test receptacle closed by the upper, receptacle valve.
Figure 3:
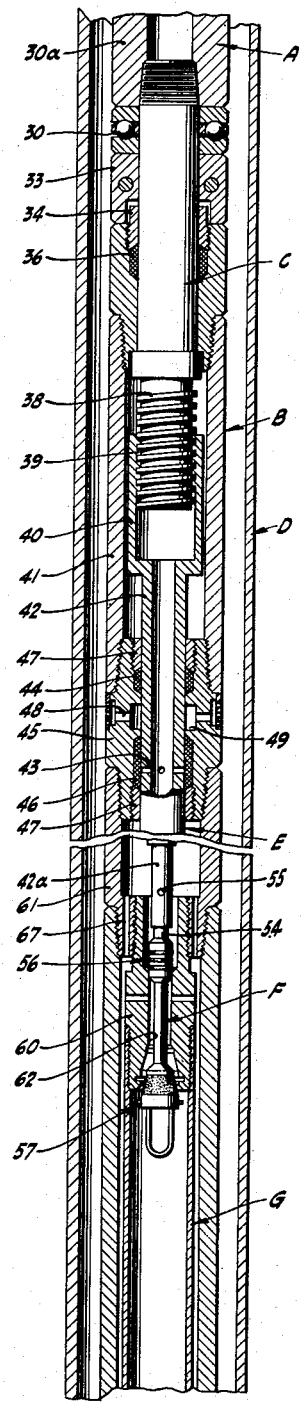
Fig. 3 is a view similar to Fig. 2 showing the test receptacle in open condition.

Receptacle G has an end closing member 60 threaded in the upper end thereof and threadedly received within a sub 61 which is in turn threaded to sub 45. End closure 60 is provided with a bore 62 in which the upper receptacle valve 56 seats, said valve being adapted to close the receptacle in the position shown in Fig. 2 and to open the receptacle in the position shown in Fig. 3. End closure 60 is provided with laterally extending ports 64 through which native fluid is adapted to enter the receptacle as the parts are depicted in Fig. 3. Passageways 67 are provided in the lower end of sub 61 to permit native fluid to flow upwardly therethrough.

Receptacle G has a lower end closure 70 provided with a punch-out valve 71 which is secured in closing position by nut 72 seating on an O ring 73. When it is desired to open the test receptacle for testing purposes after the test receptacle has been removed from the formation tester, the valve 71 can be punched into the test receptacle after removing the nut 72. There is a suitable cap 75 for enclosing the lower end of closure 70.

Figure 6:
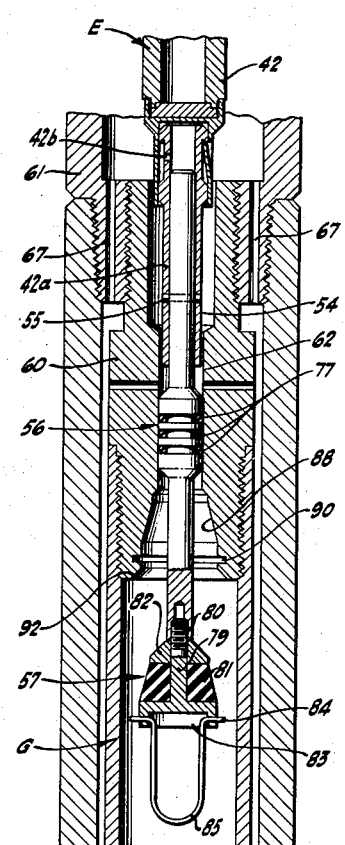
Fig. 6 is an enlarged fragmentary view of the test receptacle showing detailed construction of the receptacle valves.
Figure 5:
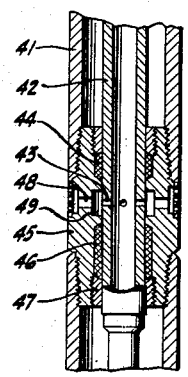
Fig. 5 is a fragmentary view of a portion of Fig. 2 showing the tester in a condition wherein the shut-in pressure reverse circulation valve member is in a position to permit reverse circulation.

The details of the receptacle valve assembly are shown in Fig. 6 and there it can be seen that the upper receptacle valve comprises an enlargement formed on valve stem 54, said enlargement being provided with annular grooves in which O rings 77 fit, thereby forming an effective seal with the bore 62 of the upper end closure 60 of the test receptacle G.

The lower, receptacle valve 57 includes an inverted T-shaped member 79 threadedly received at 80 in the lower end of stem 54, said T having a resilient seating member 81 of frustoconical shape slidably received thereon, there being a retaining member 82 engaging resilient member 81 and the lower end of valve stem 54. The T-shaped member 79 has its disc-shaped head recessed at 83 to accommodate bent ends 84, of a locking clip 85, receivable through apertures provided in the walls of the head of member 79 and protruding from said member.

The upper end closure 60 of the receptacle G has an interiorly facing valve seat 88 against which lower receptacle valve 57 is adapted to seat. Formed in the valve seat 88 is a groove 90 adapted to receive the ends 84 of the locking clip 85 to lock the valve 57 in closed position once it has been moved to closed position. There are cam surfaces at 92 on the valve seat 88 adapted to cam the ends 84 inwardly when the valve 57 moves upwardly so that said ends are retracted and then snap into the groove 90 to perform their locking function.

The operation of the device is as follows: Initially, the trip valve I is closed and can be opened only by dropping a go-devil down through the string. The packer IV is, of course, in contracted position and the retaining valve III is closed and preferably the equalizer valve at III is also closed. Shut-in pressure reverse circulation valve 42 is in an open position as shown in Fig. 2. However, since the retaining valve III is closed, fluid in the well will be prevented from passing up into the formation tester and filling it prior to a test operation. Trip valve I will be operative to prevent fluid from passing up into the drill string, still, it is desirable not to allow well fluid within the space in the formation tester between the retaining valve III and the trip valve I in order that the native fluid subsequently entering the formation tester will not be contaminated.

With the parts in the positions depicted in Fig. 2, the formation tester is lowered into the well to the zone at which it is desired to make a test. At this point, the packer IV is expanded in a manner described in my co-pending application and not necessary here to repeat, thereby separating the annular space around the tester and string above the packer from the space below the packer, thereby assuring that during the test there will be no contamination of the native fluid. Obviously, before the packer has been set there is a likelihood of some contamination or mixture of the native fluid with the well fluid thereabove and that is the reason why the entire drill string test is made prior to the entrapping of a sample in the receptacle so that as near pure a sample of native fluid as possible will be obtained in the receptacle.

The drill string is then suitably manipulated to close the by-pass valve at the packer IV, not necessary here to describe, and also to open the retaining valve III and close the equalizer valve, all as fully set forth in my prior co-pending application. The native fluid in the well may enter the formation tester through the anchor at V and pass upwardly through the formation tester, through the retaining valve III and past the receptacle G, up through the passageways 67, through the ports 43 of shut-in pressure reverse circulation valve 42 (see Fig. 2), up through the cross head 40, jack mandrel C and up to the trip valve I.

A go-devil is then dropped into the drill string tripping the trip valve and therefore opening it and allowing the native fluid in the valve to flow upwardly into the drill string to a point commensurate with the pressure in the formation below the packer IV. When the well has flowed a short period of time to provide uncontaminated native fluid, or in the event the pressure in the formation being tested is insufficient to flow the well and a state of equilibrium is reached, the drill string is rotated so that jack mandrel C causes the cross head 40 and shut-in pressure reverse circulation valve 42 to move upwardly, said latter named parts carrying receptacle valve assembly F upwardly to position upper, receptacle valve 56 above ports 64, opening the receptacle G to the native fluid, lower receptacle valve 57 being moved upwardly but still being off its seat. During this upward movement, ports 43, of valve member 42, move up into and are closed by the packing 46 thereby shutting in the native fluid above valve member 42 and preventing contamination of the fluid flowing into the receptacle G by the fluid above valve member 42 which is, although relatively pure, still more contaminated with foreign substances than the later flowing fluid.

Figure 4:
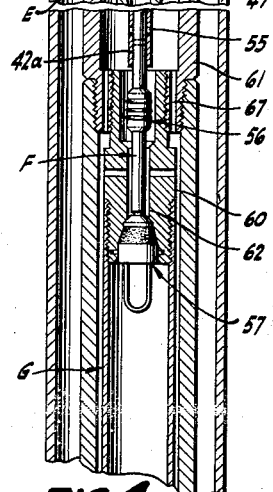
Fig. 4 is a view similar to Fig. 2 showing the test receptacle closed by the lower, receptacle valve.

After a convenient length of time sufficient to insure that the test receptacle has been filled and the pressure has been built up in the test receptacle to approximate the static pressure existing in the formation being tested, jack mandrel C is rotated by rotating drill string A to further raise the cross head 40 to an extent such that the lower, receptacle valve 57 seats on valve seat 88 closing the receptacle. Valve 57 is locked in place by the clip lock 84 snapping into the groove 90. Upon further upward movement the shear pin 55 is sheared, thereby releasing the valve assembly F from the control of the drill string, the jack mandrel and the cross head 40. The parts are then in the position shown in Fig. 4 where it can be seen that the ports 43 of shut-in pressure reverse circulation valve member 42 are still covered by the packing 46 and, therefore, the fluid in the drill string is still effectively trapped and the fluid within the test receptacle is also trapped by the lower, receptacle valve. Under these conditions the formation tester may be removed from the well, thereby obtaining both trapped samples of fluid. If desired a sub which is not ported may be substituted for the sub 45, the parts being in the position illustrated in Fig. 4 being an obvious equivalent thereof.

However, it sometimes happens that it is necessary to back-circulate or back-scuttle drilling mud down the annular space between the drill string and the well casing, into the tester and up through the drill string and this may be effected in the present invention by further rotating the drill string so as to cause the ports 43 to register with the ports 48 thereby establishing communication between the interior of the formation tester with the exterior thereof. Of course this operation has no effect whatsoever on the sample entrapped within the receptacle G. However, since the trip valve, once it has been tripped, is always open, the native fluid within the drill string and in the upper portion of the formation tester will be forced upwardly through the drill string by the reverse circulation operation.

By the present invention, a formation tester has been provided having a removable receptacle adapted to trap and recover a sample at static formation pressure, there being a suitable valve assembly associated with the receptacle and connected to the formation tester and adapted to be actuated by the movement of the drill string, which valve assembly is adapted to first positively open and then positively close the receptacle and then be released from control by the formation tester and drill string.

Having thus described my invention, what I claim and desire to secure by Letters Patent is:

1. A formation tester including a tubular housing adapted to be lowered into a well by a string of pipe, a receptacle closed at its lower end and having a mouth at its upper end, said receptacle being fixedly supported within the housing, a valve stem extending from within the receptacle through the mouth thereof out of the receptacle, a first valve on the stem closing the mouth of the receptacle and adapted to be unseated by upward movement of the stem relative to the receptacle to open said mouth, a second valve on the stem disposed within the receptacle a distance sufficient to allow opening of the mouth by unseating the first valve without the second valve being brought into seating engagement with said mouth, and means causing upward movement of the stem first in an amount sufficient to unseat the first valve without seating the second valve to permit fluid flow into the receptacle, and then a subsequent amount sufficient to seat the second valve against said mouth.

2. A formation tester including a tubular housing adapted to be lowered into a well by a string of pipe, a receptacle supported within the housing, a valve stem extending from within the receptacle through the mouth thereof out of the receptacle, a first valve on the stem closing the mouth of the receptacle and adapted to be unseated by upward movement of the stem to open said mouth, a second valve on the stem disposed within the receptacle a distance sufficient to allow opening of the mouth by unseating the first valve without the second valve being brought into seating engagement with said mouth, and means causing upward movement of the stem first in an amount sufficient to unseat the first valve without seating the second valve to permit fluid flow into the receptacle, and then a subsequent amount sufficient to seat the second valve against said mouth, said means including a member adapted to be rotated by the string of pipe and telescopically received within the housing and carrying a screw threadedly engaging a traveling nut connected to the valve stem.

3. A formation tester including a tubular housing adapted to be lowered into a well by a string of pipe, a receptacle supported within the housing, a valve stem extending from within the receptacle through the mouth thereof out of the receptacle, a slide valve on the stem disposed within and closing mouth of the receptacle and adapted to be unseated by upward movement of the stem to open said mouth, a poppet valve on the stem disposed within the receptacle a distance sufficient to allow opening of the mouth by unseating the slide valve without said poppet valve being brought into seating engagement with said mouth, and means for causing upward movement of the stem first in an amount sufficient to unseat the slide valve without seating the poppet valve to permit fluid flow into the receptacle, and then a subsequent amount sufficient to seat said second valve against said mouth.

4. A formation tester including a tubular housing adapted to be lowered into a well by a string of pipe, a receptacle supported within the housing, a valve stem extending from within the receptacle through the mouth thereof out of the receptacle, a slide valve on the stem disposed within and closing mouth of the receptacle and adapted to be unseated by upward movement of the stem to open said mouth, a poppet valve on the stem disposed within the receptacle a distance sufficient to allow opening of the mouth by unseating the slide valve without said poppet valve being brought into seating engagement with said mouth and means for causing upward movement of the stem first in an amount sufficient to unseat the slide valve without seating the poppet valve to permit fluid flow into the receptacle, and then a subsequent amount sufficient to seat said second valve against said mouth, said means including a member adapted to be rotated by the string of pipe, telescopically received within the housing, and carrying a screw threadedly engaging a traveling nut connected to the valve stem.

5. A formation tester including a tubular housing adapted to be lowered into a well by a string of pipe, a receptacle closed at its lower end and having a mouth at its upper end, said receptacle being fixedly supported within the housing, a valve stem extending from within the receptacle through the mouth thereof out of the receptacle, a first valve on the stem closing the mouth of the receptacle and adapted to be unseated by upward movement of the stem relative to the receptacle to open said mouth, a second valve on the stem disposed within the receptacle a distance sufficient to allow opening of the mouth by unseating the first valve without the second valve being brought into seating engagement with said mouth, means causing upward movement of the stem first in an amount sufficient to unseat the first valve without seating the second valve to permit fluid flow into the receptacle, and then a subsequent amount sufficient to seat the second valve against said mouth, and means for locking the valve stem against movement after seating of the second valve.

6. A formation tester including a tubular housing adapted to be lowered into a well by a string of pipe, a receptacle supporting within the housing, a valve stem extending from within the receptacle through the mouth thereof out of the receptacle, a slide valve on the stem disposed within and closing mouth of the receptacle and adapted to be unseated by upward movement of the stem to open said mouth, a poppet valve on the stem disposed within the receptacle a distance sufficient to allow opening of the mouth by unseating the slide valve without said poppet valve being brought into seating engagement with said mouth, means for causing upward movement of the stem first in an amount sufficient to unseat the slide valve without seating the poppet valve to permit fluid flow into the receptacle, and then a subsequent amount sufficient to seat said second valve against said mouth, and means for locking the valve stem against movement after seating of the poppet valve.

7. A formation tester including a tubular housing adapted to be lowered into a well by a string of pipe, a receptacle supported within the housing, a valve stem extending from within the receptacle through the mouth thereof out of the receptacle, a first valve on the stem closing the mouth of the receptacle and adapted to be unseated by upward movement of the stem to open said mouth, a second valve on the stem disposed within the receptacle a distance sufficient to allow opening of the mouth by unseating the first valve without the second valve being brought into seating engagement with said mouth, means causing upward movement of the stem first in an amount sufficient to unseat the first valve without seating the second valve to permit fluid flow into the receptacle, and then a subsequent amount sufficient to seat the second valve against said mouth and means for locking the valve stem against movement after seating of the second valve, the first-named means including a member adapted to be rotated by the string of pipe, telescopically received within the housing, and carrying a screw threadedly engaging a traveling nut detachably connected to the valve stem, whereby the traveling nut and valve stem are detached after the second valve has been seated to free the second valve from the influence of the screw and nut.

8. A formation tester including a tubular housing adapted to be lowered into a well by a string of pipe, a receptacle supported within the housing, a valve stem extending from within the receptacle through the mouth thereof out of the receptacle, a slide valve on the stem disposed within and closing mouth of the receptacle and adapted to be unseated by upward movement of the stem to open said mouth, a poppet valve on the stem disposed within the receptacle a distance sufficient to allow opening of the mouth by unseating the slide valve without said poppet valve being brought into seating engagement with said mouth, means for causing upward movement of the stem first in an amount sufficient to unseat the slide valve without seating the poppet valve to permit fluid flow into the receptacle, and then a subsequent amount sufficient to seat said second valve against said mouth, and means for locking the valve stem against movement after seating of the poppet valve, the first-named means including a member adapted to be rotated by the string of pipe, telescopically received within the housing, and carrying a screw threadedly engaging a traveling nut detachably connected to the valve stem, whereby after the poppet valve has been seated and locked in place the traveling nut is detached from the valve stem to free the poppet valve from the influence of the screw and nut.

9. A formation tester, including a tubular housing adapted to be lowered into a well by a supporting string of pipe, said housing having a port in the side wall thereof communicating the exterior of the housing with the interior thereof, packing means within the housing disposed on opposite sides of said port, a tubular member communicating at its upper end with the interior of the supporting string of pipe and slidably extending through the packing means and having a port in its side walls initially disposed below the port in the housing an extent such as to be exposed to the interior of the housing below the lower portion of the packing means, but adapted to be brought into registry with the port in the housing to allow fluid flow through said ports, a receptacle supported within the housing below the packing means, said housing having a passageway permitting the flow of fluid from below the receptacle, past the exterior thereof to a point thereabove, a valve stem extending from within the receptacle through the mouth thereof out of said receptacle, and being detachably connected to the tubular member, a first valve on the stem closing the mouth of the receptacle and adapted to be unseated by upward movement of the stem to open said mouth, a second valve on the stem disposed within the receptacle a distance sufficient to allow opening of the mouth by unseating the first valve without the second valve being brought into seating engagement with said mouth, the port in said tubular member being initially spaced a distance below the port in the housing such that it will be disposed within the confines of the lower portion of the packing means at the time the second valve is brought into seating engagement with the mouth of the receptacle, means for causing upward movement of the tubular member first in an amount sufficient to unseat the first valve without seating the second valve to permit fluid flow into the receptacle, and then a subsequent amount sufficient to seat the second valve against said mouth, and then a still subsequent amount sufficient to detach the tubular member from the stem and bring the port in the tubular member into registry with the port in the housing.

10. A formation tester, including a tubular housing adapted to be lowered into a well by a supporting string of pipe, said housing having a port in the side wall thereof communicating the exterior of the housing with the interior thereof, packing means within the housing disposed on opposite sides of said port, a tubular member communicating at its upper end with the interior of the string of pipe, slidably extending through the packing means and having a port in its side walls initially disposed below the port in the housing an extent such as to be exposed to the interior of the housing at a point below the lower portion of the packing means, but adapted to be brought within the confines of the lower portion of the packing means or in registry with the port in the housing, in such second instance to allow fluid flow through said ports, a receptacle supported within the housing below the packing means, said housing having a passageway therein providing communication within the housing between points above and below the receptacle, a valve stem extending from within the receptacle through the mouth thereof out of said receptacle, said stem being detachably connected to the tubular member, a first valve on the stem closing the mouth of the receptacle and adapted to be unseated by upward movement of the stem to open said mouth, a second valve on the stem disposed within the receptacle a distance sufficient to allow opening of the mouth by unseating the first valve without the second valve being brought into seating engagement with said mouth, the spacing of the port on said tubular member below the port in the housing being such that when the first and second valves are unseated the port in the tubular mandrel is disposed within the confines of the lower portion of the packing means, means for causing upward movement of the stem first in an amount sufficient to unseat the first valve without seating the second valve to permit fluid flow into the receptacle, and then a subsequent amount sufficient to seat the second valve against said mouth, and then a still subsequent amount sufficient to detach the tubular member from the stem and bring the port of the tubular member into registry with the port in the housing.

11. A formation tester, including a tubular housing adapted to be lowered into a well by a supporting string of pipe, said housing having a port in the side wall thereof communicating the exterior of the housing with the interior thereof, packing means within the housing disposed on opposite sides of said port, a tubular member communicating at its upper end with the interior of the supporting string of pipe and slidably extending through the packing means and having a port in its side walls initially disposed below the port in the housing an extent such as to be exposed to the interior of the housing below the lower portion of the packing means, but adapted to be brought into registry with the port in the housing to allow fluid flow through said ports, a receptacle supported within the housing below the packing means, said housing having a passageway permitting the flow of fluid from below the receptacle, past the exterior thereof to a point thereabove, a valve stem extending from within the receptacle through the mouth thereof out of said receptacle, and being detachably connected to the tubular member, a first valve on the stem closing the mouth of the receptacle and adapted to be unseated by upward movement of the stem to open said mouth, a second valve on the stem disposed within the receptacle a distance sufficient to allow opening of the mouth by unseating the first valve without the second valve being brought into seating engagement with said mouth, the port in said tubular member being initially spaced a distance below the port in the housing such that it will be disposed within the confines of the lower portion of the packing means at the time the second valve is brought into seating engagement with the mouth of the receptacle, means for causing upward movement of the tubular member first in an amount sufficient to unseat the first valve without seating the second valve to permit fluid flow into the receptacle, and then a subsequent amount sufficient to seat the second valve against said mouth, and then a still subsequent amount sufficient to detach the tubular member from the stem and bring the port in the tubular member into registry with the port in the housing, the last-named means including a tubular member adapted to be connected to the supporting string of pipe and rotated thereby and being telescopically received within the housing and carrying a hollow screw threadedly engaging a hollow traveling nut which is connected to the first-named tubular member.

12. A formation tester, including a tubular housing adapted to be lowered into a well by a supporting string of pipe, said housing having a port in the side wall thereof communicating the exterior of the housing with the interior thereof, packing means within the housing disposed on opposite sides of said port, a tubular member communicating at its upper end with the interior of the string of pipe, slidably extending through the packing means and having a port in its side walls initially disposed below the port in the housing an extent such as to be exposed to the interior of the housing at a point below the lower portion of the packing means, but adapted to be brought within the confines of the lower portion of the packing means or in registry with the port in the housing, in such second instance to allow fluid flow through said ports, a receptacle supported within the housing below the packing means, said housing having a passageway therein providing communication within the housing between points above and below the receptacle, a valve stem extending from within the receptacle through the mouth thereof out of said receptacle, said stem being detachably connected to the tubular member, a first valve on the stem closing the mouth of the receptacle and adapted to be unseated by upward movement of the stem to open said mouth, a second valve on the stem disposed within the receptacle a distance sufficient to allow opening of the mouth by unseating the first valve without the second valve being brought into seating engagement with said mouth, the spacing of the port on said tubular member below the port in the housing being such that when the first and second valves are unseated the port in the tubular mandrel is disposed within the confines of the lower portion of the packing means, means for causing upward movement of the stem first in an amount sufficient to unseat the first valve without seating the second valve to permit fluid flow into the receptacle, and then a subsequent amount sufficient to seat the second valve against said mouth, and then a still subsequent amount sufficient to detach the tubular member from the stem and bring the port of the tubular member into registry with the port in the housing, the last-named means including a tubular member adapted to be connected to the supporting string of pipe and rotated thereby and being telescopically received by the housing and carrying a hollow screw threadedly engaging a hollow traveling nut connected to the first-named tubular member.

13. A formation tester, including a tubular housing adapted to be lowered into a well by a supporting string of pipe, said housing having a port in the side wall thereof communicating the exterior of the housing with the interior thereof, packing means within the housing disposed on opposite sides of said port, a tubular member communicating at its upper end with the interior of the supporting string of pipe and slidably extending through the packing means and having a port in its side walls initially disposed below the port in the housing an extent such as to be exposed to the interior of the housing below the lower portion of the packing means, but adapted to be brought into registry with the port in the housing to allow fluid flow through said ports, a receptacle supported within the housing below the packing means, said housing having a passageway permitting the flow of fluid from below the receptacle, past the exterior thereof to a point thereabove, a valve stem extending from within the receptacle through the mouth thereof out of said receptacle, and being detachably connected to the tubular member, a first valve on the stem closing the mouth of the receptacle and adapted to be unseated by upward movement of the stem to open said mouth, a second valve on the stem disposed within the receptacle a distance sufficient to allow opening of the mouth by unseating the first valve without the second valve being brought into seating engagement with said mouth, the port in said tubular member being initially spaced a distance below the port in the housing such that it will be disposed within the confines of the lower portion of the packing means at the time the second valve is brought into seating engagement with the mouth of the receptacle, means for causing upward movement of the tubular member first in an amount sufficient to unseat the first valve without seating the second valve to permit fluid flow into the receptacle, and then a subsequent amount sufficient to seat the second valve against said mouth, and then a still subsequent amount sufficient to detach the tubular member from the stem and bring the port in the tubular member into registry with the port in the housing, and means for locking the valve stem against movement after seating of the second valve.

14. A formation tester, including a tubular housing adapted to be lowered into a well by a supporting string of pipe, said housing having a port in the side wall thereof communicating the exterior of the housing with the interior thereof, packing means within the housing disposed on opposite sides of said port, a tubular member communicating at its upper end with the interior of the string of pipe, slidably extending through the packing means and having a port in its side walls initially disposed below the port in the housing an extent such as to be exposed to the interior of the housing at a point below the lower portion of the packing means, but adapted to be brought within the confines of the lower portion of the packing means or in registry with the port in the housing, in such second instance to allow fluid flow through said ports, a receptacle supported within the housing below the packing means, said housing having a passageway therein providing communication within the housing between points above and below the receptacle, a valve stem extending from within the receptacle through the mouth thereof out of said receptacle, said stem being detachably connected to the tubular member, a first valve on the stem closing the mouth of the receptacle and adapted to be unseated by upward movement of the stem to open said mouth, a second valve on the stem disposed within the receptacle a distance sufficient to allow opening of the mouth by unseating the first valve without the second valve being brought into seating engagement with said mouth, the spacing of the port on said tubular member below the port in the housing being such that when the first and second valves are unseated the port in the tubular mandrel is disposed within the confines of the lower portion of the packing means, means for causing upward movement of the stem first in an amount sufficient to unseat the first valve without seating the second valve to permit fluid flow into the receptacle, and then a subsequent amount sufficient to seat the second valve against said mouth, and then a still subsequent amount sufficient to detach the tubular member from the stem and bring the port of the tubular member into registry with the port in the housing, and means for locking the valve stem against movement after seating of the second valve.

References Cited in the file of this patent

UNITED STATES PATENTS

| Number | Name | Date |
|---|---|---|
| 1,870,634 | Lewis | Aug. 9, 1932 |
| 1,875,006 | Humason | Aug. 30, 1932 |
| 2,073,107 | Johnston | Mar. 9, 1937 |
| 2,079,140 | Yarbrough | May 4, 1937 |
| 2,086,935 | Cox | July 13, 1937 |
| 2,103,940 | Fletcher | Dec. 28, 1937 |
| 2,366,547 | Oak | Jan. 2, 1945 |